United States Patent
Jiang et al.

(10) Patent No.: US 9,363,583 B2
(45) Date of Patent: Jun. 7, 2016

(54) SYSTEM AND METHOD FOR REDUCING THE STIMULATED RAMAN SCATTERING CROSSTALK IN CHANNEL MONITORING

(71) Applicant: Huawei Technologies Co., Ltd., Shenzhen (CN)

(72) Inventors: Zhiping Jiang, Kanata (CA); Jian Zhong, Kanata (CA)

(73) Assignee: Futurewei Technologies, Inc., Plano, TX (US)

( * ) Notice: Subject to any disclaimer, the term of this patent is extended or adjusted under 35 U.S.C. 154(b) by 166 days.

(21) Appl. No.: 14/142,392

(22) Filed: Dec. 27, 2013

(65) Prior Publication Data

US 2015/0189407 A1    Jul. 2, 2015

(51) Int. Cl.
*H04B 10/2537* (2013.01)
*H04Q 11/00* (2006.01)
*H04J 14/02* (2006.01)

(52) U.S. Cl.
CPC ....... *H04Q 11/0005* (2013.01); *H04B 10/2537* (2013.01); *H04J 14/0212* (2013.01); *H04J 14/0221* (2013.01); *H04J 14/0272* (2013.01); *H04Q 11/0066* (2013.01); *H04Q 2011/0049* (2013.01); *H04Q 2011/0083* (2013.01)

(58) Field of Classification Search
CPC .................................................. H04B 10/2537
See application file for complete search history.

(56) References Cited

U.S. PATENT DOCUMENTS

| | | | |
|---|---|---|---|
| 5,425,115 A * | 6/1995 | Wagner | 385/16 |
| 8,078,054 B2 | 12/2011 | Jiang et al. | |
| 2005/0094928 A1* | 5/2005 | Ng et al. | 385/15 |
| 2009/0285581 A1* | 11/2009 | Kim et al. | 398/140 |
| 2010/0188496 A1 | 7/2010 | Xie et al. | |
| 2011/0080580 A1 | 4/2011 | Fermann et al. | |
| 2013/0188565 A1 | 7/2013 | Wang et al. | |

OTHER PUBLICATIONS

International Search Report received in Application No. PCT/US13/78219, mailed Jun. 11, 2014, 10 pages.

\* cited by examiner

*Primary Examiner* — Nathan Curs
(74) *Attorney, Agent, or Firm* — Slater Matsil, LLP

(57) ABSTRACT

System, apparatus, and method embodiments are provided for suppressing the stimulated Raman scattering (SRS) crosstalk in multiple wavelength channel signals propagating in fiber links, such as in WDM/DWDM or other optical communications systems. The SRS is reduced or suppressed by separating the channels into two sets of different channels, such as even and odd channels, and then performing subtraction of signal amplitudes between the two sets of channels. The channels are separated by an interleaver into the two sets. Alternatively, a wavelength selective switch (WSS) is used to separate the channels into the two sets on which the subtraction of signal amplitudes is then performed. In an embodiment, the signals are low frequency modulation signals used for channel monitoring for optical communications systems.

18 Claims, 3 Drawing Sheets

SYSTEM AND METHOD FOR REDUCING THE STIMULATED RAMAN SCATTERING CROSSTALK IN CHANNEL MONITORING

TECHNICAL FIELD

The present invention relates to the field of optical communications, and, in particular embodiments, to a system and method for reducing the stimulated Raman scattering crosstalk in channel monitoring.

BACKGROUND

In optical systems such as dense wavelength division multiplexing (DWDM) systems, low frequency modulations can be applied to wavelength channels to carry channel wavelength information and other identification information, which improves fiber link management and enables power monitoring. Low frequency modulation based channel monitoring, e.g., tone based channel monitoring, can be used for various applications (e.g., for DWDM systems). However, its applications are limited by the stimulated Raman scattering (SRS) caused crosstalk of modulated optical signals in the fiber links. This crosstalk can substantially distort the low frequency modulations in optical signals and hence reduce channel monitoring efficiency and performance. There is a need to reduce or suppress this SRS crosstalk in the signals.

SUMMARY OF THE INVENTION

In accordance with an embodiment of the disclosure, a method by an optical receiver for suppressing stimulated Raman scattering (SRS) crosstalk between wavelength channels in a received optical signal includes receiving an optical signal comprising a plurality of wavelength channels. The wavelength channels are split, at the optical receiver, into a first set and a second set of wavelength channels. The first set and the second set comprise about a same number of non-overlapping wavelength channels. The method further includes subtracting from each first wavelength channel in the first set a corresponding second wavelength channel in the second set.

In accordance with another embodiment of the disclosure, an apparatus for suppressing crosstalk between wavelength channels in a received optical signal comprises an optical splitter configured to split an incoming optical signal comprising a plurality of wavelength channels into a first set and a second set of wavelength channels. The first set and second set comprise about a same number of non-overlapping wavelength channels. The apparatus further comprises a first photo-detector coupled to a first port of the optical splitter and configured to convert the wavelength channels in the first set into a first set of electrical signals proportional to the wavelength channels in the first set. A second photo-detector is also coupled to a second port of the optical splitter and configured to convert the wavelength channels in the second set into a second set of electrical signals proportional to the wavelength channels in the second set. Additionally, a circuit is coupled to the first photo-detector and the second photo-detector and configured to subtract signal amplitudes between each corresponding pair of electrical signals in the first set of electrical signals and the second set of electrical signals.

In accordance with yet another embodiment of the disclosure, a method by an optical network component for suppressing crosstalk between wavelength channels in received optical signals includes receiving a plurality of wavelength channels corresponding to low frequency modulation signals, and splitting the wavelength channels into a first set and a second set of wavelength channels. The first set and the second set comprise non-overlapping sets of wavelength channels. The wavelength channels are then converted in the first set and the second set into electrical signals. The method further includes subtracting signal amplitudes between each corresponding pair of electrical signals in the first set and the second set, which reduces SRS crosstalk in the signal amplitudes corresponding to the wavelength channels.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

System, apparatus, and method embodiments are provided herein for suppressing the stimulated Raman scattering (SRS) crosstalk in multiple wavelength channel signals propagating in fiber links, for instance in WDM/DWDM or other optical communications systems. The schemes herein suppress or reduce the SRS crosstalk in the signals, which reduces signal distortions or errors, e.g., at a receiver. The SRS is reduced or suppressed by separating the channels into even and odd channels, and then performing subtraction (of wavelength channel powers) between the two sets of channels. The channels can be separated by a relatively low cost interleaver (ITL) into even and odd channels. The SRS crosstalk is then reduced by subtracting powers or amplitudes of the even channel signals from the odd channel signals (or vice versa). Alternatively, a wavelength selective switch (WSS) can be used to separate the channels into two sets on which the subtraction is then performed. The signals can be low frequency modulation signals used for channel monitoring, e.g., tone based channel monitoring in coherent or 10 Gigabit (10 G) systems.

Figure 1:
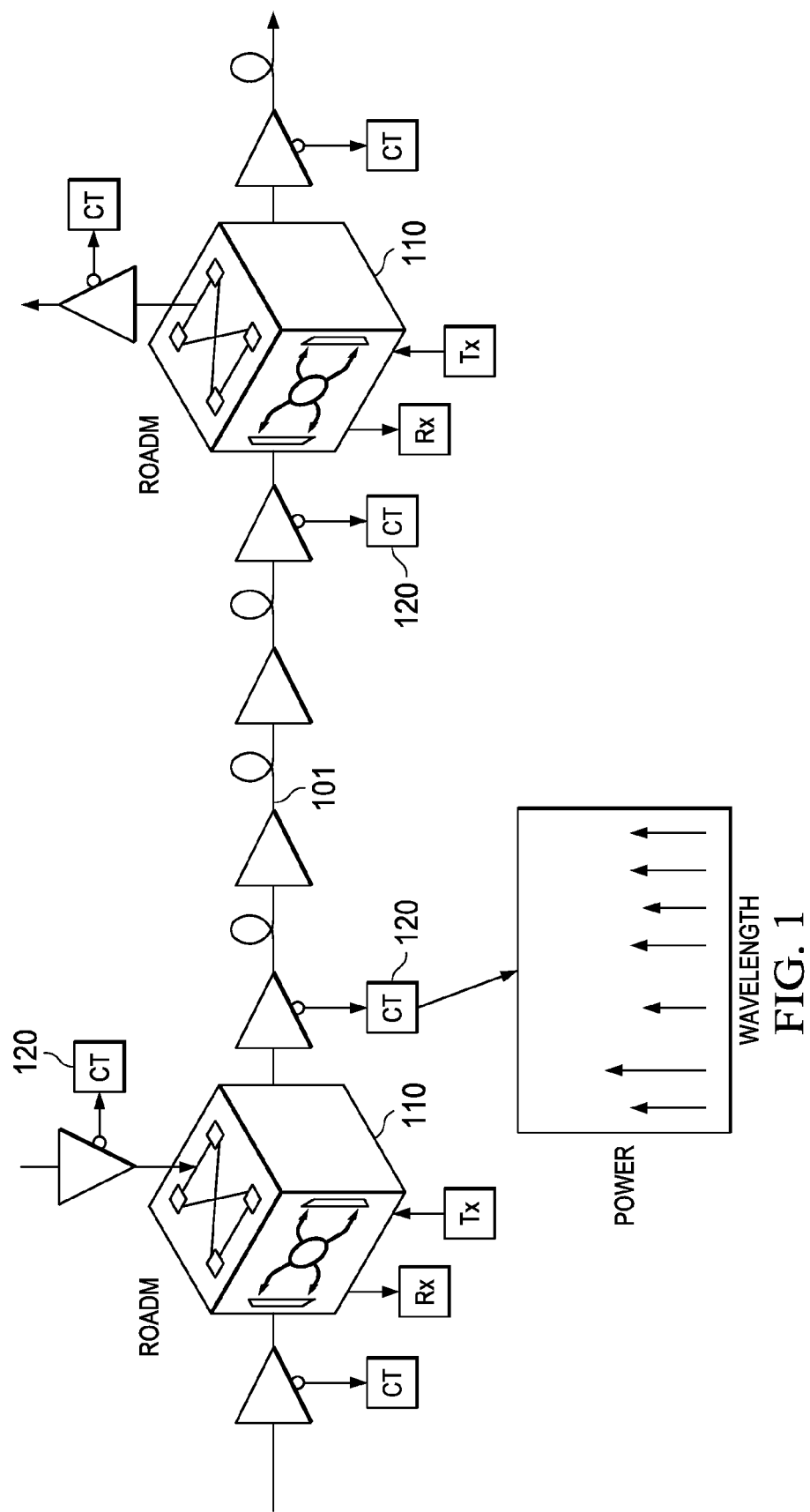
FIG. 1 illustrates an example of a wavelength division multiplexing (WDM) optical communications system.

FIG. 1 shows an example of a WDM, or dense WDM (DWDM), optical communications system 100. The system 100 includes reconfigurable optical add-drop multiplexers (ROADMs) 110 connected to each other via optical fiber links 101. Although two ROADMs 110 are shown in FIG. 1, the system 100 can include any number of ROADMs 110 interconnected via fiber links 101. The ROADM 110 switches WDM traffic at the wavelength layer. Specifically, the ROADM 110 comprises an optical add-drop multiplexer that performs wavelength selective switching. This allows individual or multiple wavelengths carrying data channels to be added and/or dropped from a transport fiber without the need to convert the signals on all of the WDM channels to electronic signals and back again to optical signals. A ROADM 110 can transmit on a fiber link 101 (or links) and receive on another fiber link 101 (or links). Additionally, a channel tracking (CT) detector/module 120 is coupled at ingress and egress of fiber links 101 of the ROADMs 110. The CT detector/module 120 performs channel monitoring based on the low frequency modulation in the received signals. The channel monitoring may include power measurement and wavelength identification of optical signals passing through the fiber links 101.

The signals received on a fiber link 101 may include multiple wavelength channels. The multiple wavelength channels propagating in a fiber link 101 may suffer from the SRS effect, where energy in lower wavelength channels tend to transfer to higher wavelength channels, thus changing the original powers/amplitudes of the wavelength channels (which is referred to as crosstalk) and causing signal distortion in the channels, as seen by on the receiver side. Channel monitoring at a CT detector/module 120, e.g., at an output of an optical amplifier on the fiber, is affected by the distortions in low frequency modulated signals due to the SRS crosstalk. This results in lower communications efficiency and performance.

Figure 2:
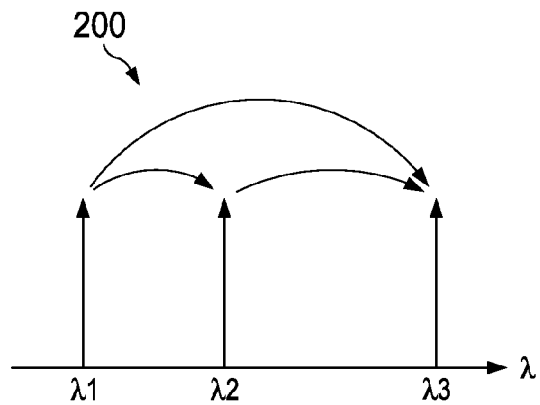
FIG. 2 illustrates a stimulated Raman scattering (SRS) effect in multiple wavelength optical signals.

FIG. 2 illustrates a SRS effect in multiple wavelength channel signals. When there is more than one wavelength channel, energy is transferred to longer wavelengths from shorter wavelengths due to the SRS effect. Multiple factors affect SRS, including signal power, the number of spans, the number of channels, channel distribution, and the fiber type. For instance, in C band, the SRS crosstalk is approximately proportional to the frequency difference between two channels. Low frequency modulation on one channel is also transferred to other channels. Because of this SRS effect, the detected tone power also includes contributions from other channels. For example, the channel $\lambda 1$ has low frequency modulation f1. Due to SRS, f1 appears on channel $\lambda 2$ and $\lambda 3$. The SRS crosstalk caused error can be more than 5 dB in multi-span systems, making power monitoring useless. The error can be so large that even the channel detection is in error.

Figure 3:
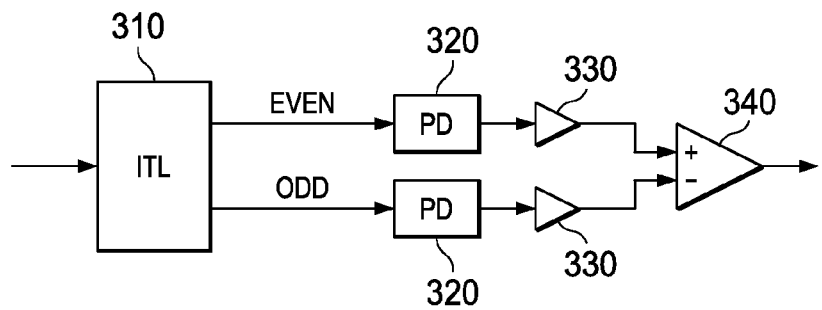
FIG. 3 illustrates an embodiment of a system/apparatus for SRS crosstalk suppression.

In an embodiment, the CT detector/module 120 is configured to suppress the SRS in the received signals. This is achieved by splitting the received multiple channel signals into two non-overlapping sets of equal number of channels, and then subtracting channel pairs in the two sets from one another. FIG. 3 illustrates an embodiment of a system/apparatus 300 for SRS crosstalk suppression, which can be used when detecting low frequency modulation signals for channel monitoring. The apparatus 300 includes an optical interleaver 310, two photo-detectors 320 (e. g., two photodiodes), two amplifier 330 (e.g., amp circuits), and a subtraction circuit 340 (e.g., an op-amp circuit). The interleaver 310 is an optical device made using any suitable optical components/designs and configured to separate multiple wavelength channels into two interleaving (non-overlapping) sets of even and odd channels. For example, the interleaver 310 comprises a simple one stage Mach-Zehnder (MZ) interferometer. The two sets have the same channel separation, which is equal to twice the channel separation in the original incoming combined signal at the input of the interleaver 310. The remaining components are electrical/electronic components made using any suitable electronic components/designs, including analog components, digital components, or both. Each of the photo-detectors 320 converts a corresponding set of even or odd channels from optical to electrical signals. The amplifiers 330 amplify the corresponding electrical signals. The subtraction circuit 340 subtracts the corresponding electric signal strengths, which are proportional to the wavelength channel powers, between corresponding pairs of even and odd channels.

In another embodiment, any of the electric signal domain steps can be implemented using digital signal processing (DSP) instead of using circuit components. The signal subtraction in frequency domain can be implemented using DSP, e.g., via software instead of circuit design. For example, instead of an electrical operational amplifier or the subtraction circuit 340, two analog-to-digital converters (ADCs) can be used to digitize the two signals, and hence performing the subtraction digitally or via software.

Figure 4A:
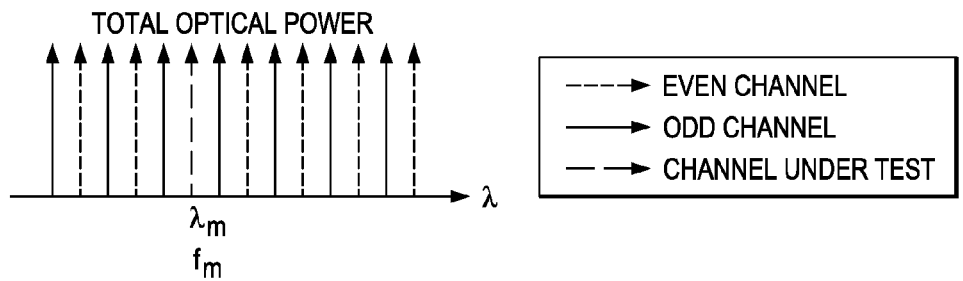
FIG. 4a illustrates total optical power of multiple optical channels including channel $\lambda_m$ modulated by frequency $f_m$.
Figure 4B:
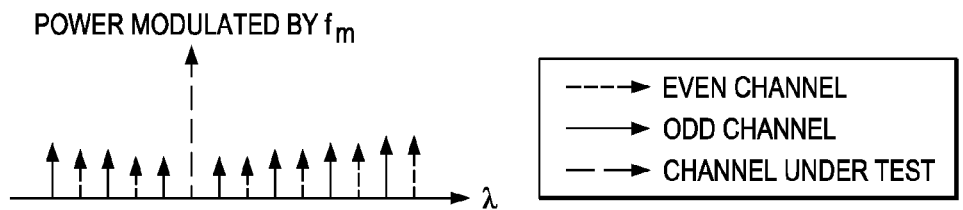
FIG. 4b illustrates power redistribution of channel $\lambda_m$ modulated by $f_m$ to other channels due to SRS effect.

FIG. 4a illustrates power at a plurality of channels. The channels include a wavelength channel $\lambda_m$ modulated by low frequency tone $f_m$, channel monitoring purpose. FIG. 4b shows power redistribution in the fiber from channel $\lambda_m$ to other adjacent channels due to SRS. The channel tone may be partially transferred to all other channels through SRS effect. Due to this SRS effect, the channel's power modulated by $f_m$ is no longer strictly proportional to the original optical power for $\lambda_m$, but also contains contributions from other channels. To suppress this SRS effect and correct the modulated power detection for $\lambda_m$, the channels are separated using the interleaver 310 into two paths, even channels path and odd channels path. One of the two paths contains the channel $\lambda_m$ to be measured with added SRS crosstalk from the even channels. The other path contains the SRS crosstalk from the odd channels only. The SRS for $\lambda_m$ is suppressed when the SRS crosstalk of the odd channels is subtracted from that of the even channels. This approach assumes that the crosstalk due to SRS is about equally distributed between the even and odd channels, and hence subtracting the channel powers in the two sets from each other is expected to at least partially cancel out the crosstalk across all channels.

Initially, only channel $\lambda_m$ is modulated by frequency $f_m$. However, due to SRS in fiber, some of the power of the $\lambda_m$ channel is transferred to the adjacent channels, which is manifested as undesirable crosstalk (power redistribution) between the channels. Modulation $f_m$ appears in channel $\lambda_m$, as well as in other channels due to SRS effect. The SRS is, to some extent, proportional to the wavelength difference. Thus, the further away an adjacent channel is from channel $\lambda_m$, the stronger the SRS crosstalk. When electric signal strengths (proportional to modulated channel powers) in the two sets are subtracted from each other, the SRS crosstalk is reduced, and hence the signal to crosstalk ratio for $\lambda_m$ is improved, providing improved detection and hence channel monitoring for low frequency modulation. The scenario in FIGS. 4a and 4b shows SRS crosstalk suppression for a single channel at the detector. However, the same scheme is also capable to suppress in parallel (at the same time) the SRS crosstalk in multiple received and detected channels. In other words, subtracting the even and odd channels' powers from each other can also result in improving the signal to crosstalk ratio for multiple channels received in a combined signal.

In the case all channels are even channels or odd channels, the apparatus 300 may not suppress the SRS crosstalk. On the other hand, the suppression is the largest when the channels are split evenly between even and odd channels. Usually the larger the number of channels, the higher the SRS suppression. Better suppression can be achieved by arranging the channels so that they are more evenly split between even and odd channels or any two non-overlapping sets of channels.

In another embodiment, a wavelength selective switch (WSS) is used in the apparatus 300 instead of the interleaver 310. The remaining components of the apparatus 300 may not be changed. The WSS is based on multiple optical filters that allow splitting any group of incoming channels into a first set and a second satisfying two criteria, an equal number of channels in each set; and evenly distributed SRS crosstalk for all channels. However, the spacing between the channels in either set does not need to be fixed. The WSS allows selecting any arbitrary channels from the group of incoming channels into the two sets to meet these two criteria. The two criteria are needed to efficiently suppress the SRS crosstalk by subtracting the detected channel powers between the two sets.

Figure 5:
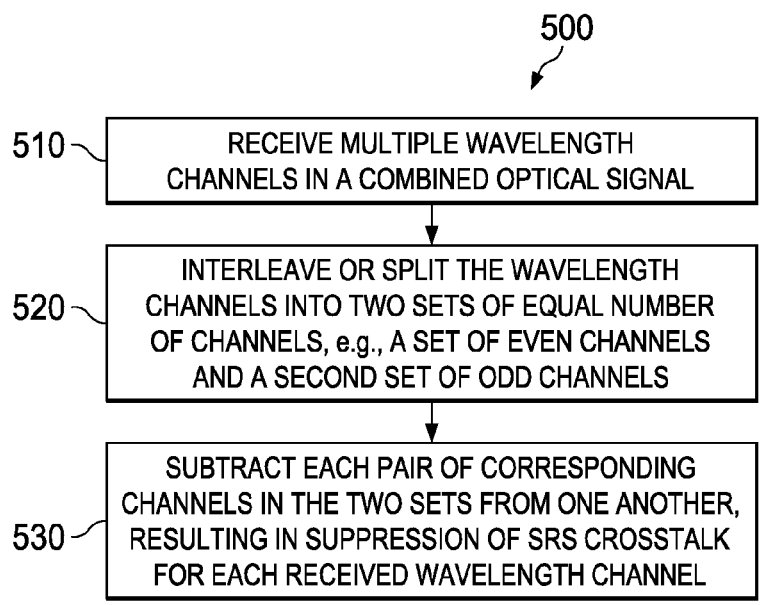
FIG. 5 illustrates an embodiment of a method for SRS crosstalk suppression.

FIG. 5 illustrates an embodiment of a method 500 for SRS crosstalk suppression. The method 500 is implemented at a receiver, for example, a ROADM 110 or CT detector/module 120, which comprises the apparatus 300 or a comparable apparatus/system as described above. Specifically, the method 500 suppresses the SRS crosstalk by subtracting detected signals between two sets of even and add channels (e.g., using the apparatus 300) or between any two groups of channels that satisfy the two criteria above (e.g., using a WSS and subtraction). At step 510, multiple wavelength channels are received in a combined optical signal. At step 520, the wavelength channels are interleaved or split into two sets of equal number of channels, e.g., a set of even channels and a second set of odd channels. This step is implemented in the optical signal domain, e.g., using an interleaver, a WSS, or any other suitable device. At step 530, each pair of corresponding channels in the two sets is subtracted from one another, resulting in suppression of SRS crosstalk for each received wavelength channel. This step is implemented in the electrical signal domain, using detectors and amplifiers that convert and amplify the channel signals from optical to electric domain, and using an electric circuit for subtracting the signals.

Figure 6:
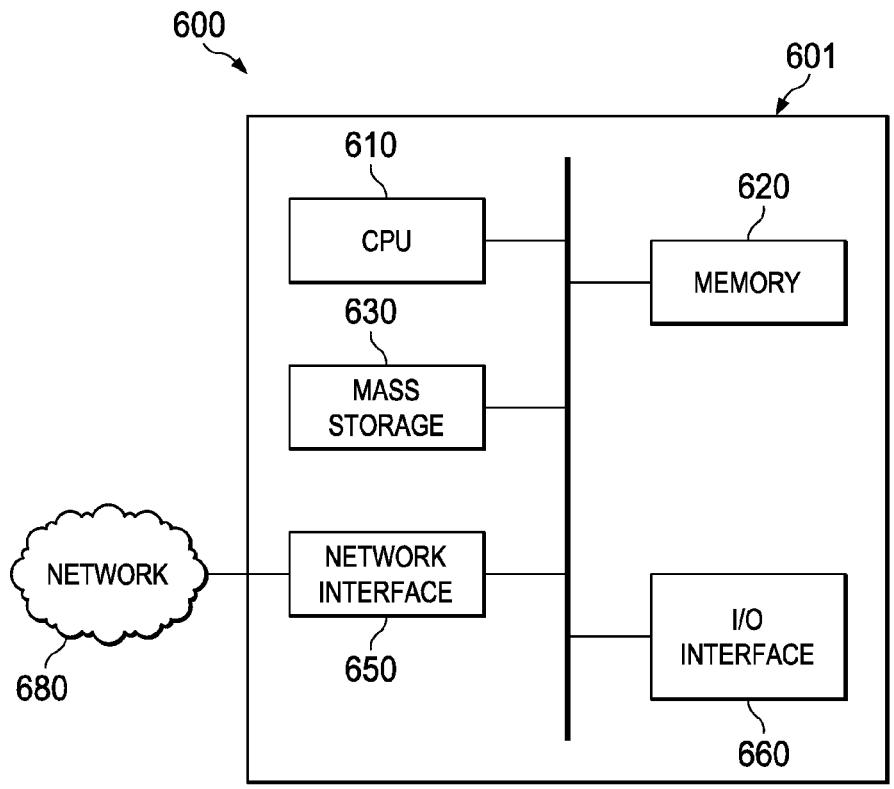
FIG. 6 is a diagram of a processing system that can be used to implement various embodiments.

FIG. 6 is a block diagram of an exemplary processing system 600 that can be used to implement various embodiments. For instance, the processing system 600 can be used to implement some steps of the methods above using DSP and software. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 600 may comprise a processing unit 601 equipped with one or more input/output devices, such as a network interfaces, storage interfaces, and the like. The processing unit 601 may include a central processing unit (CPU) 610, a memory 620, a mass storage device 630, and an I/O interface 660 connected to a bus. The bus may be one or more of any type of several bus architectures including a memory bus or memory controller, a peripheral bus or the like.

The CPU 610 may comprise any type of electronic data processor. The memory 620 may comprise any type of system memory such as static random access memory (SRAM), dynamic random access memory (DRAM), synchronous DRAM (SDRAM), read-only memory (ROM), a combination thereof, or the like. In an embodiment, the memory 620 may include ROM for use at boot-up, and DRAM for program and data storage for use while executing programs. In embodiments, the memory 620 is non-transitory. The mass storage device 630 may comprise any type of storage device configured to store data, programs, and other information and to make the data, programs, and other information accessible via the bus. The mass storage device 630 may comprise, for example, one or more of a solid state drive, hard disk drive, a magnetic disk drive, an optical disk drive, or the like.

The processing unit 601 also includes one or more network interfaces 650, which may comprise wired links, such as an Ethernet cable or the like, and/or wireless links to access nodes or one or more networks 680. The network interface 650 allows the processing unit 601 to communicate with remote units via the networks 680. For example, the network interface 650 may provide wireless communication via one or more transmitters/transmit antennas and one or more receivers/receive antennas. In an embodiment, the processing unit 601 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:
1. A method by an optical receiver, the method comprising:
   receiving an optical signal comprising a plurality of wavelength channels;
   splitting the wavelength channels into a first set and a second set of wavelength channels, the first set and the second set comprising about a same number of non-overlapping wavelength channels; and subtracting from each first wavelength channel in the first set a corresponding second wavelength channel in the second set, wherein the wavelength channels correspond to low frequency modulation signals relative to a data rate of payload data in the optical signal.

2. The method of claim 1, wherein splitting the wavelength channels into the first set and the second set of wavelength channels comprises splitting the wavelength channels into a first set of even channels and a second set of odd channels using an optical interleaver, and wherein the even channels and the odd channels have equal wavelength spacing.

3. The method of claim 1 further comprising converting the wavelength channels in each of the first set and the second set into electric signals using a corresponding photodiode.

4. The method of claim 1, wherein subtracting from each first wavelength channel in the first set a corresponding second wavelength channel in the second set comprises:
   detecting electric signal amplitudes of the wavelength channels; and
   subtracting the electric signal amplitudes between each first wavelength channel in the first set and corresponding second wavelength channel in the second set.

5. The method of claim 1, wherein the wavelength channels are split into the first set and the second set of wavelength channels using a wavelength selective switch (WSS), wherein the wavelength channels in the first set have variable wavelength spacing, and wherein the wavelength channels in the second set have equal wavelength spacing to corresponding wavelength channels in the first set.

6. The method of claim 1, wherein the received optical signal comprises stimulated Raman scattering (SRS) crosstalk.

7. The method of claim 6, wherein the SRS crosstalk is evenly distributed across the wavelength channels in the first set and the second set.

8. An apparatus comprising:
   an optical splitter configured to split an incoming optical signal comprising a plurality of wavelength channels into a first set and a second set of wavelength channels, the first set and second set comprising about a same number of non-overlapping wavelength channels;
   a first photo-detector coupled to a first port of the optical splitter and configured to convert the wavelength channels in the first set into a first set of electrical signals proportional to the wavelength channels in the first set;
   a second photo-detector coupled to a second port of the optical splitter and configured to convert the wavelength channels in the second set into a second set of electrical signals proportional to the wavelength channels in the second set; and
   a circuit coupled to the first photo-detector and the second photo-detector and configured to subtract signal amplitudes between each corresponding pair of electrical signals in the first set of electrical signals and the second set of electrical signals,
   wherein the wavelength channels correspond to low frequency modulation signals relative to a data rate of payload data in the optical signal.

9. The apparatus of claim 8, wherein the optical splitter is an interleaver configured to split the wavelength channels into a first set of even channels and a second set of odd channels, and wherein the even channels and the odd channels have equal wavelength spacing.

10. The apparatus of claim 8, wherein the optical splitter is a wavelength selective switch (WSS) configured to split the wavelength channels into the first set and the second set, wherein the wavelength channels in the first set have variable wavelength spacing, and wherein the wavelength channels in the second set have equal wavelength spacing to corresponding wavelength channels in the first set.

11. The apparatus of claim 8 further comprising:
   a first amplifier positioned between the first photo-detector and the circuit and coupled to a positive input to the circuit; and
   a second amplifier positioned between the second photo-detector and the circuit and coupled to a negative input to the circuit.

12. The apparatus of claim 8, wherein the apparatus is a channel tracking (CT) module.

13. The apparatus of claim 8, wherein the wavelength channels include stimulated Raman scattering (SRS) crosstalk.

14. The apparatus of claim 13, wherein the SRS crosstalk is evenly distributed across the wavelength channels in the first set and the second set.

15. A method by an optical network component the method comprising:
   receiving an optical signal comprising a plurality of wavelength channels corresponding to low frequency modulation signals relative to a data rate of payload data in the optical signal, the low frequency modulation signals carrying channel monitoring information;
   splitting the wavelength channels into a first set and a second set of wavelength channels, the first set and the second set comprising non-overlapping sets of wavelength channels;
   converting the wavelength channels in the first set and the second set into electrical signals; and
   subtracting signal amplitudes between each corresponding pair of electrical signals in the first set and the second set,
   wherein subtracting the signal amplitudes between each corresponding pair of electrical signals in the first set and the second set substantially reduces stimulated Raman scattering (SRS) crosstalk in the signal amplitudes corresponding to the wavelength channels.

16. The method of claim 15, wherein converting the wavelength channels in the first set and the second set into electrical signals comprises:
   detecting the wavelength channels in the first set using a first photo-detector; and
   detecting the wavelength channels in the second set using a second photo-detector.

17. The method of claim 15, wherein splitting the wavelength channels into the first set and the second set of wavelength channels comprises interleaving the wavelength channels into a first set of even channels and a second set of odd channels, and wherein the odd channels and the even channels have equal wavelength spacing and equal number of wavelength channels.

18. The method of claim 15, wherein splitting the wavelength channels into the first set and the second set of wavelength channels comprises selectively switching a first subset of wavelength channels into the first set and a second subset of wavelength channels into the second set, wherein the wavelength channels in the first set have variable wavelength spacing, and wherein the wavelength channels in the second set have equal wavelength spacing to corresponding wavelength channels in the first set.

* * * * *